US006774305B2

(12) United States Patent
Wellman et al.

(10) Patent No.: US 6,774,305 B2
(45) Date of Patent: Aug. 10, 2004

(54) SELF-GROUNDING CONNECTOR FOR JOINING END SECTIONS OF FLUID FLOW CONDUITS AND FABRICATION PROCESSES THEREFOR

(76) Inventors: Raymond L. Wellman, 6527 Morris Ave., El Cerito, CA (US) 95430; Michael S. Cork, 2552 Honeysuckle Dr., Richardson, TX (US) 75082

( * ) Notice: Subject to any disclaimer, the term of this patent is extended or adjusted under 35 U.S.C. 154(b) by 0 days.

(21) Appl. No.: 10/217,832

(22) Filed: Aug. 13, 2002

(65) Prior Publication Data

US 2003/0000592 A1 Jan. 2, 2003

Related U.S. Application Data

(63) Continuation-in-part of application No. 09/882,683, filed on Jun. 18, 2001, now Pat. No. 6,561,229.

(51) Int. Cl.$^7$ ................................................. H05K 5/02
(52) U.S. Cl. ................................ 174/51; 174/59; 174/6; 439/92; 138/146
(58) Field of Search ............................ 174/51, 59, 60, 174/6, 35 CC, 90 CC, 135; 439/98, 92, 100, 86, 87, 192; 361/753; 138/146, 132, 153

(56) References Cited

U.S. PATENT DOCUMENTS

| 3,949,213 | A | * | 4/1976 | Paitchell | ..................... | 362/101 |
| 4,082,915 | A | * | 4/1978 | Silver | ........................ | 174/51 |
| 4,685,236 | A | * | 8/1987 | May | ........................ | 42/76.02 |
| 5,942,725 | A | * | 8/1999 | Daoud | ........................ | 174/51 |
| 6,114,630 | A | * | 9/2000 | Gretz | ........................ | 174/65 R |
| 6,240,970 | B1 | * | 6/2001 | Ostrander et al. | ........... | 138/137 |
| 6,315,004 | B1 | | 11/2001 | Wellman et al. | ............ | 138/146 |

* cited by examiner

*Primary Examiner*—Dhiru R Patel
(74) *Attorney, Agent, or Firm*—Donald Diamond

(57) ABSTRACT

An electrically self-grounding connector for joining end portions of fluid flow conduit sections, and processes for fabricating two embodiments of the connector. A connector formed according to one process includes an inner layer having electrically conductive, contiguous carbon ribbons, an outer layer with chopped carbon fibers, and a layer of surfacing veil between the inner and outer layers. A connector formed according to the other process has an inner layer of carbon cloth, an outer layer with chopped carbon fibers, and a layer of surfacing veil and putty between the inner and outer layers. In both connectors, highly electrically conductive carbon at the connector inner and outer surfaces acts to dissipate and neutralize electrostatic charges generated by triboelectric processes.

17 Claims, 6 Drawing Sheets

US 6,774,305 B2

SELF-GROUNDING CONNECTOR FOR JOINING END SECTIONS OF FLUID FLOW CONDUITS AND FABRICATION PROCESSES THEREFOR

CROSS-REFERENCE TO RELATED APPLICATION

This application is a continuation-in-part of application Ser. No. 09/882,683 filed Jun. 18, 2001, published as Ser. No. 2002/0017333 A1, entitled "Electrostatic Charge Neutralizing Fume Duct With Continuous Carbon Fiber," and issued on May 13. 2003 as U.S. Pat. No. 6,561,229.

BACKGROUND OF THE INVENTION

1. Field of the Invention

The present invention relates to gas and fluid flow conduits such as ductwork, and more particularly to a connector for joining end portions of conduit sections. The connector includes carbon fibers which dissipate and neutralize built-up electrostatic charges resulting from triboelectric processes as vapors, gases or liquids flow through a conduit. Such dissipation and neutralization by use of electrically conductive materials is referred to herein as "self-grounding."

2. Description of the Related Art

Published application Ser. No. 2002/0017333 A1 ("'333"), which is incorporated in its entirety herein by reference, discloses a self-grounding dual-wall duct for transporting corrosive vapors and gases, and a process for fabricating such ducts and pipe. The duct has a laminated inner wall whose innermost layer incorporates continuous, helically-wound carbon filament ribbons which dissipate and neutralize built-up electrostatic charges resulting from vapor or gas flow. The '333 reference further discloses a joint assembly providing high electrical conductivity, and thereby self-grounding, across the joint. The assembly includes a self-grounding collar for joining two dual-laminate duct sections. The collar has a laminate construction including two relatively thin inner layers of carbon filament ribbon impregnated with an epoxy or any other type of chemically resistant vinyl ester resin-and-curing agent admixture, and a relatively thick outer layer of glass filament ribbon impregnated with the admixture. The assembly further includes a sealant having chopped carbonized carbon fibers. The filament layers provide self-grounding of the collar inner surface, and the fibers provide self-grounding of the collar outer surface.

Pat. No. 6,315,004 ("'004") to R. L. Wellman et al., which is incorporated in its entirety herein by reference, discloses a laminated inner wall of a dual-wall fume duct for transporting corrosive vapors and gases, and a process for fabricating the wall. The innermost layer of the wall is made of a cured epoxy or any other type of chemically resistant vinyl ester resin incorporating chopped carbonized carbon fibers.

OBJECTS OF THE INVENTION

It is a primary object of the present invention to provide an improved connector impermeable to hazardous gases, vapors and fluids, and which dissipates and neutralizes electrostatic charge build-up on its inner and outer surfaces.

Another object of the invention is to provide a self-grounding connector fabricated using a substantially automated production process amenable to standardization and high quality control.

Yet another object of the invention is to provide a simplified production process using fewer types and lesser amounts of fabrication materials per unit connector.

Other objects of the invention will become evident when the following description is considered with the accompanying drawing figures. In the figures and description, numerals indicate the various features of the invention, like numerals referring to like features throughout both the drawings and description.

SUMMARY OF THE INVENTION

These and other objects are achieved by the present invention which in a first aspect provides a rigid self-grounding connector for joining end portions of fluid flow conduit sections. The connector includes an inner layer determining a connector inner surface and including a first highly electrically conductive material, and an outer layer determining a connector outer surface and including a second highly electrically conductive material. These materials, respectively, dissipate and neutralize electrostatic charges accumulating on the inner and outer surfaces.

In another aspect the invention provides a process for making a self-grounding connector for joining end portions of fluid flow conduit sections. The steps include: (a) covering a mandrel with a non-sticking material; (b) forming over the material a layer using a conductive material and a fluidic admixture; (c) forming over the layer a second layer using a second conductive material and the admixture; and (d) removing the formed layers from the mandrel to form the connector.

In yet another aspect the invention provides a first process for making a self-grounding connector for joining end portions of fluid flow conduit sections. The process steps include: (a) forming a fluidic admixture of a settable chemically resistant resin and a curing agent; (b) coating a non-sticking sheeting covering a mandrel with a layer of the admixture; (c) helically winding around the sheeting a band formed by contiguous, continuous electrically conductive ribbons having continuous carbon filaments impregnated with the admixture, thereby forming a ribbon-layer embedded in the admixture layer; (d) coating the ribbon-layer with a second admixture layer; (e) helically winding a layer of surfacing veil wetted out with the admixture; (f) coating the veil with a third admixture layer; (g) depositing chopped carbon fibers to cover the veil; (h) integrating the fibers and admixture to form a layer of wetted out fibers terminating in a smooth outer surface; and (i) orthogonally winding a second band having at least one ribbon impregnated with the admixture, thereby forming a circumferential bead.

In still another aspect the invention provides a second process for making a self-grounding connector for joining end portions of fluid flow conduit sections. The process steps include: (a) forming a fluidic admixture of a settable chemically resistant resin and a curing agent; (b) coating a non-sticking sheeting covering a mandrel with a first layer of the admixture; (c) helically winding around the sheeting a layer of carbon cloth wetted out with the admixture; (d) curing the admixture layer and wetted out cloth; (e) covering the cloth with a layer of putty; (f) helically winding into the putty a layer of surfacing veil; (g) curing the putty; (h) coating the veil with a second layer of the admixture; (i) depositing chopped carbon fibers to cover the veil; (j) integrating the fibers and admixture to form a layer of wetted out fibers terminating in a smooth outer surface; and (k) orthogonally winding a second band having at least one ribbon impregnated with the admixture, thereby forming a circumferential bead.

A more complete understanding of the present invention and other objects, aspects and advantages thereof will be

DETAILED DESCRIPTION OF THE PREFERRED EMBODIMENTS

I. Introduction

Figure 1:
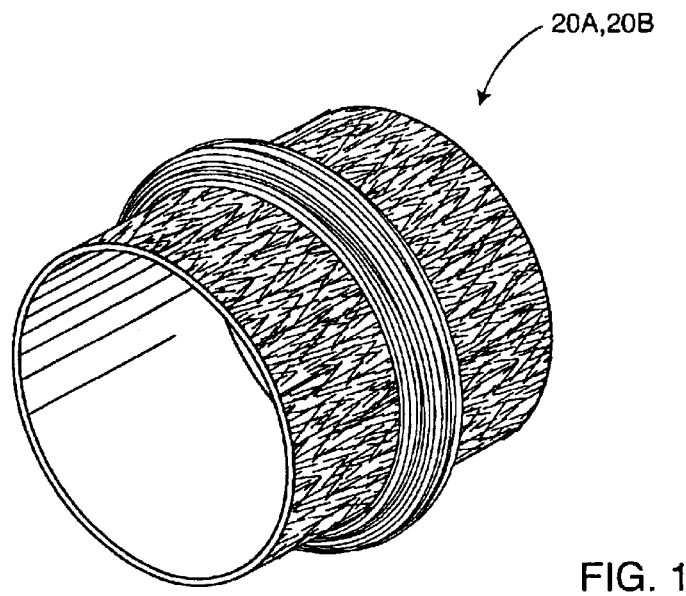
FIG. 1 is a perspective view of a self-grounding connector according to the invention, including a circumferential bead.

While the present invention is open to various modifications and alternative constructions, the preferred embodiment shown in the drawings will be described herein in detail. It is to be understood, however, there is no intention to limit the invention to the particular forms disclosed. On the contrary, it is intended that the invention cover all modifications, equivalents and alternative constructions falling within the spirit and scope of the invention as expressed in the appended claims.

II. Connector with Carbon Fiber-Filament Inner Wall

Figure 2A:
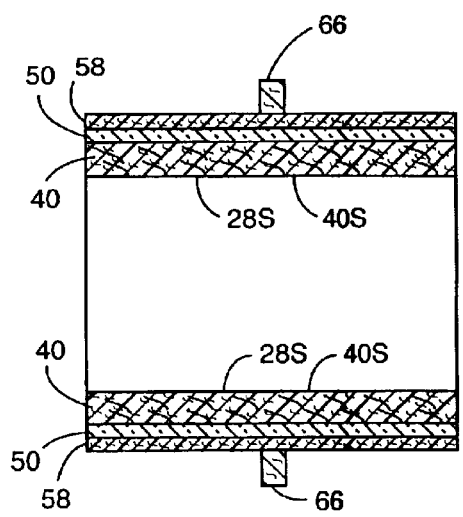
FIG. 2A is a schematic cross-sectional view of the FIG. 1 connector fabricated according to a first process embodiment.
Figure 3:
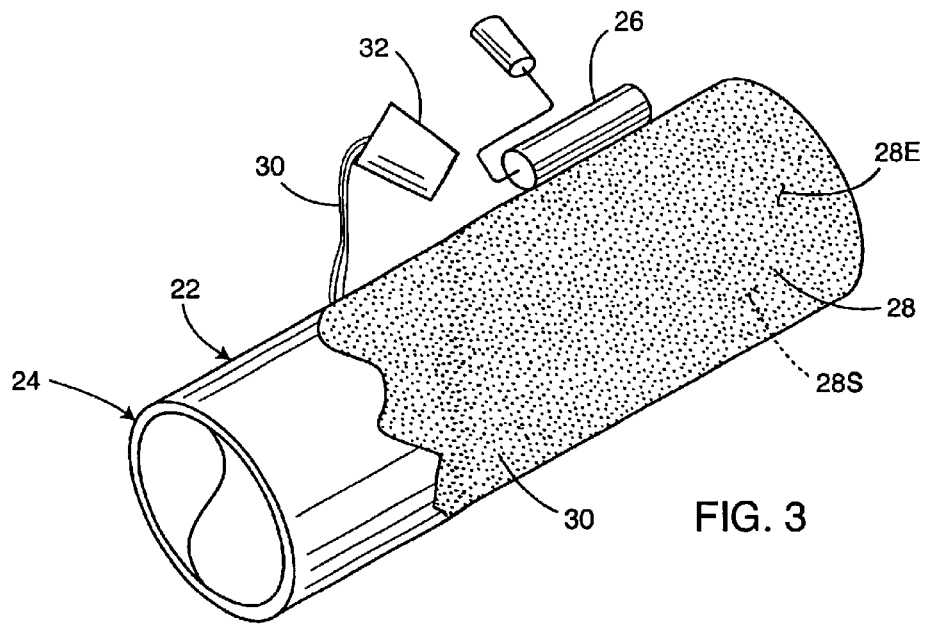
FIG. 3 schematically shows a first step in making a FIG. 2A or FIG. 2B connector wherein a thin coating of an admixture of a settable chemically resistant resin and a curing agent therefor is rolled onto a non-sticking sheeting covering a rotating mandrel.
Figure 4:
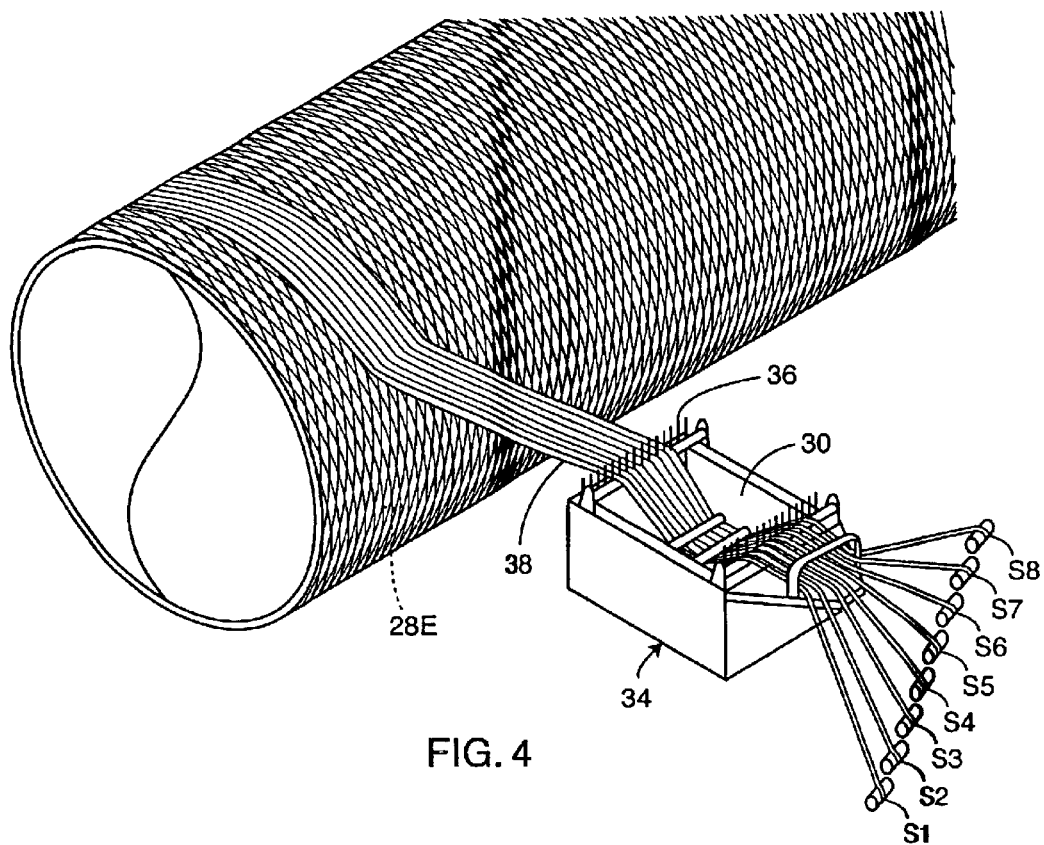
FIG. 4 schematically shows a second step in making the FIG. 2A connector wherein continuous, contiguous carbon fiber-filament ribbons, after transiting a bath containing the FIG. 3 admixture, are helically wound around the sheeting until its surface is totally covered with a single ribbon-layer, as hereinafter defined.

FIGS. 3, 4, 6A, 7A, 8, 9, 10 and 11 show sequential steps in fabricating a self-grounding connector 20A according to a first embodiment of the invention, as shown in FIGS. 1 and 2A. Referring to FIG. 3, in a first step a sheeting 22 made of a non-sticking material and covering a slowly rotating, generally circular mandrel 24 is evenly coated using a fiberglass applicator roller 26 with a thin layer 28 of a liquid admixture 30 of a settable chemically resistant resin, either halogenated or unhalogenated, and a curing agent therefor. Preferably these are, respectively, an epoxy vinyl ester impregnating resin and benzoyl peroxide. Preferably, the sheeting is a polyester film such as MYLAR®. Other materials which can be used include: (a) fluoropolymer films such as HALAR® ethylene trichlorofluoroethylene copolymer and KYNAR® (poly)vinylidene fluoride; (b) polyolefin films such as polypropylene film; (c) other polyester films; and (d) metallic foils such as wax coated aluminum foil. Alternatively, a cardboard tube is interposed between the mandrel and sheeting to further facilitate removal of the finished cylindrical product from the mandrel. Layer 28 has an interior surface 28S contiguous to the sheeting 22 and an exterior surface 28E. Layer 28 is 2 to 3 mils in thickness and is dispensed from a suitable dispensing device 32. The benzoyl peroxide, which is 1 to 5 percent-by-weight relative to the weight of the resin, cures the liquid resin to a solid at ambient temperature. About 0.3 pound of resin per square foot of mandrel surface area is used. Preferably, the resin is type 510A-40 DERAKANE® manufactured by the Dow Chemical Company of Channahon, Ill.

Mandrel 24 is clamped generally horizontally between a rotating chuck and a tailstock spindle of a filament winding machine, and rotates at a selectable constant rate. As detailed in the '333 published application, a two-axis machine is used to apply a matrix of carbon fibers and resin under controlled tension to the mandrel in a predetermined geometrical pattern. As shown schematically in FIG. 4, in a second step a plurality of continuous carbon fiber-filament ribbons is helically wound onto the mandrel after passage through a bath 34 containing the admixture 30. In a preferred embodiment eight ribbons, each about 0.250-inch in width and about 0.010-inch in thickness, after unwinding from contiguous spools S1, S2, S3, S4, S5, S6, S7, S8 and exiting bath 34, are aligned edge-to-edge by a payout eye 36 to form a two-inch wide band 38. The band is wound helically onto surface 28E at an angle of about 72° with respect to the mandrel's longitudinal axis to form a diamond-shaped pattern. As the eye moves back and forth along the mandrel, interstices in the pattern are filled in to form a single continuous ribbon-layer 40 (see FIG. 6A). Ribbon-layer 40 is embedded in admixture layer 28 so that interior surface 28S is integrated with a smooth continuous surface 40S (see FIG. 2A) of resin-impregnated carbon fiber-filaments which preferably is about 63 percent carbon and 37 percent admixture, by weight, within a feasible range of about 50 to 70 percent carbon and about 30 to 50 percent admixture. Typically, the thickness of ribbon-layer 40 is about 25 mils, but can be between 15 and 35 mils. Alternatively, a lesser or greater number of ribbons may be used to provide a narrower or wider bandwidth. Preferably, the ribbon used is PANEX® 33–48K continuous carbon fiber which has a filament count of 45,700 and a yield of 450 ft/lb, manufactured from polyacrylonitrile (PAN) precursor by Zoltek Corporation of St. Louis, Mo.

Figure 6A:
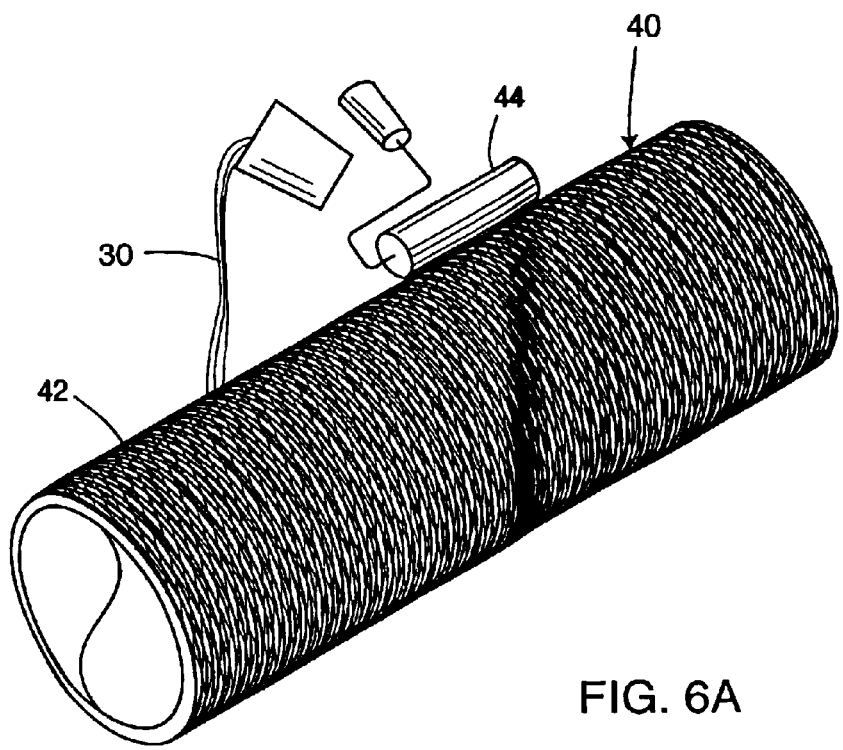
FIG. 6A schematically shows a third step in making the FIG. 2A connector wherein a second thin coating of the FIG. 3 admixture is applied to the outer surface formed by the FIG. 4 contiguous ribbons and trapped air is rolled out with a roller.

Referring to FIG. 6A, in a third step ribbon-layer 40 is evenly coated with a thin layer 42 of admixture 30, and a fiberglass "deairing" roller 44 is used to roll out air trapped in the ribbon-layer. Layer 42 typically is 2–3 mils in thickness.

Figure 7A:
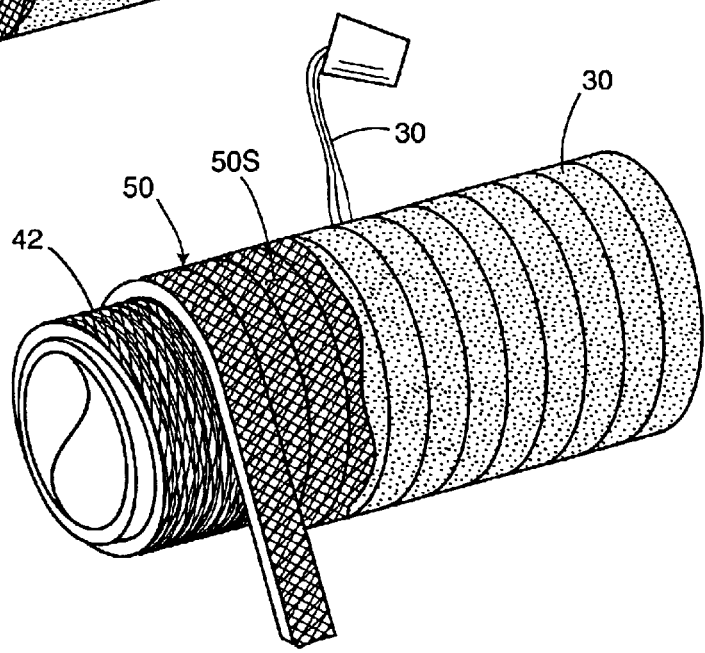
FIG. 7A schematically shows a fourth step in making the FIG. 2A connector wherein a layer of surfacing veil, wetted out with the FIG. 3 admixture, is helically wound into the FIG. 6A admixture coating.

Referring to FIG. 7A, in a fourth step a layer 50 of surfacing veil having an outer surface 50S, about 10 mils in thickness and wetted out with the admixture 30, is helically wound over layer 42. Typically, the veil width is about 4 inches. Preferably, glass "C"-veil is used. C-veil is glass fiber tissue of randomly dispersed glass fibers bonded into a sheet by a polyester resin. The fibers are produced from "C" glass, a chemically resistant glass highly resistant to attack by both acid and alkaline environments. C-veil is available commercially from Owens Corning Corp.

Figure 8:
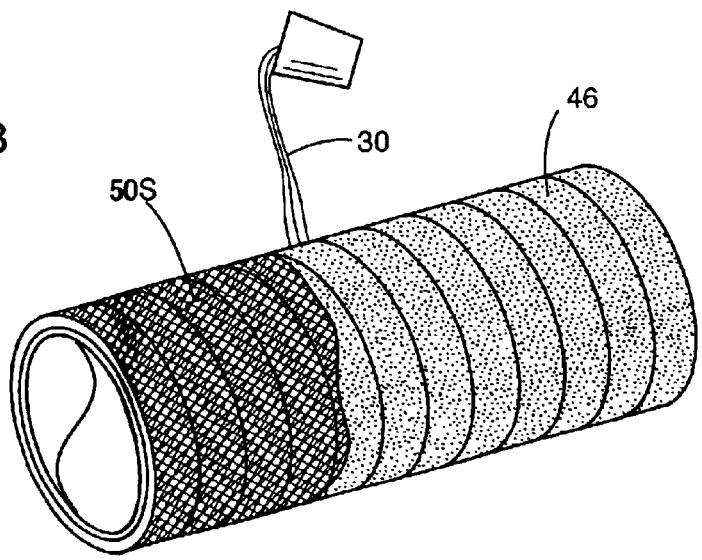
FIG. 8 shows a fifth step in making the FIG. 2A or FIG. 2B connector wherein, respectively, a third or second, thin coating of the FIG. 3 admixture is applied to the veil outer surface.
Figure 9:
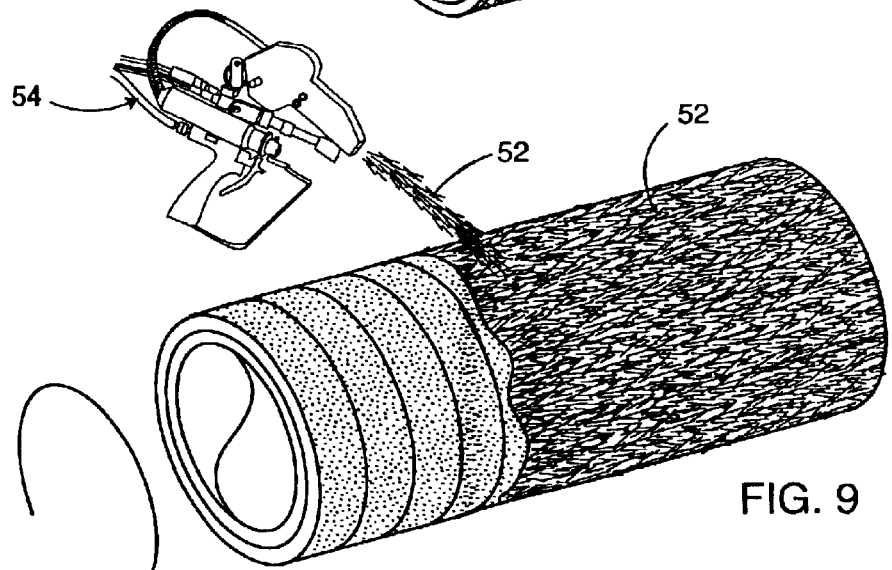
FIG. 9 schematically shows a sixth step in making the FIG. 2A or FIG. 2B connector wherein a layer of chopped carbonized carbon fibers is deposited onto and into the layer of FIG. 3 admixture covering the FIG. 8 veil outer surface.
Figure 10:
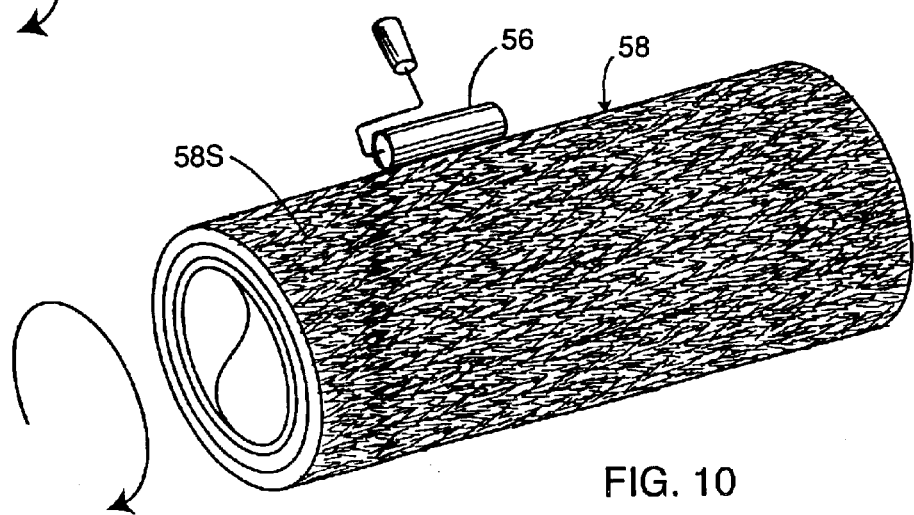
FIG. 10 schematically shows a seventh step in making the FIG. 2A or FIG. 2B connector wherein a roller is used to smooth out the FIG. 9 fibers.

Referring to FIG. 8, in a fifth step surface 50S is evenly coated with a thin layer 46 of liquid admixture 30. Preferably, the thickness of layer 46 is about 10 mils. Referring to FIG. 9, in a sixth step a multiplicity of quarter-inch length chopped carbon fibers 52 are evenly applied onto and into layer 46 as the mandrel rotates. The fibers are manufactured by heating, oxidizing and carbonizing PAN fibers. Preferably, the fibers are PANEX® 33-CF, manufactured by Zoltek Corporation, which have a diameter of 0.283 mil, a density of 0.065 lb/in$^3$, and an electrical resistivity of 0.00068 ohm-inch. Preferably, the fibers 52 are sprayed on using a chop-gun 54 such as manufactured by Venus-Gusmer Inc. of Kent, Wash. Alternatively, the fibers may be applied by hand. Referring to FIG. 10, in a seventh step a deairing roller 56 is used to break down any clumps of fibers and blend the fibers with admixture 30, resulting in a homogeneous layer 58 of fibers and admixture having a thickness of about 10 mils and a generally smooth outer surface 58S.

Figure 11:
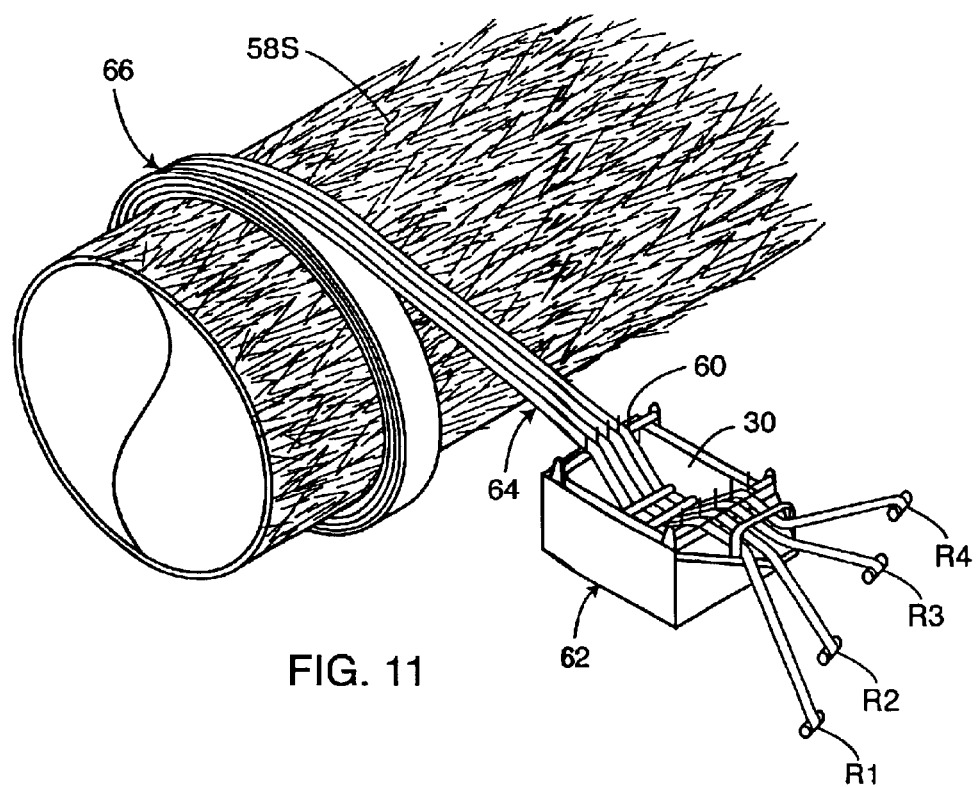
FIG. 11 schematically shows an eighth step in making the FIG. 2A or FIG. 2B connector wherein continuous, contiguous carbon fiber-filament ribbons, after transiting a bath containing FIG. 3 admixture, are orthogonally wound around the FIG. 10 surface to form a circumferential bead.
Figure 12:
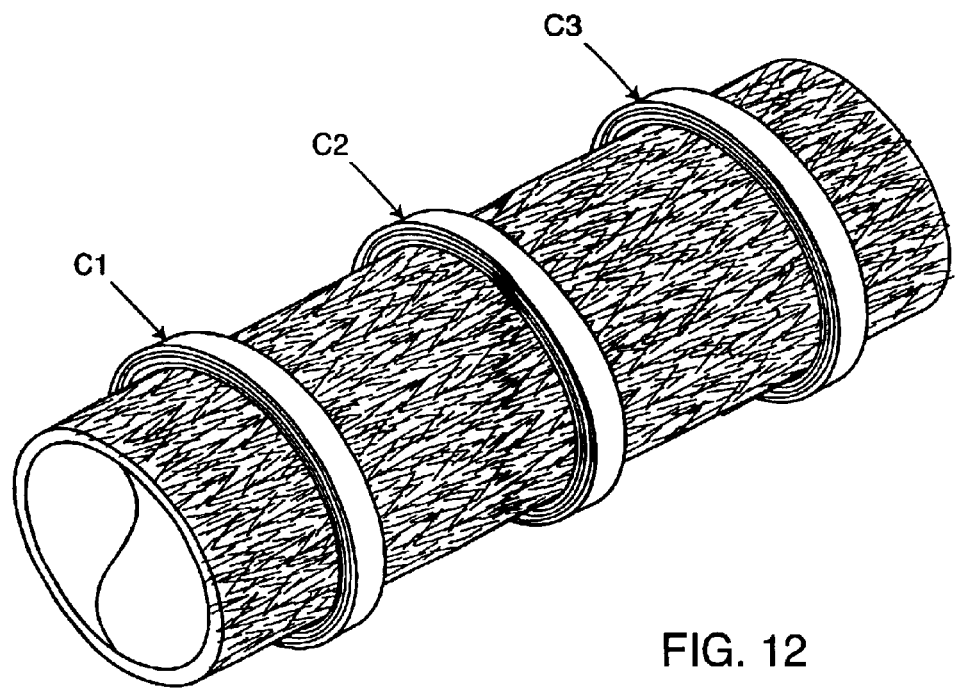
FIG. 12 schematically shows how several FIG. 2A or FIG. 2B connectors are successively made by forming a plurality of FIG. 10 beads spaced along the mandrel.

Referring to FIG. 11, in an eighth step a plurality of continuous carbon fiber-filament ribbons, aligned edge-to-edge by a stationary payout eye 60 to form a band 64 of a preselected width, are orthogonally wound around surface 58S after passage through a bath 62 containing admixture 30. Sufficient ribbon-layers are formed to create a circumferential bead 66 having a height in a range from 0.187- to 0.250-inch. FIG. 11 schematically shows four ribbons unwinding from contiguous spools R1, R2, R3, R4. The number of spools and the ribbon width used in a particular manufacturing run depend on the bead width desired. FIG. 12 schematically shows that after a bead is completed the payout eye is moved a preselected distance along the mandrel and another bead is formed. After curing the resultant carbon-glass-carbon cylindrical tube at ambient temperature and sliding it off the mandrel, a plurality of beaded connectors C1, C2, C3, . . . are produced by successively sawing off transverse segments each having a bead equidistant between its ends. Alternatively, sawing may be done with the tube still on the mandrel.

Paragraph 0041 and FIG. 9 of the '333 application disclose a collar used in a joint assembly to connect the end portions of two fume duct sections. The same technique is employed in using the self-grounding connectors of the present invention to connect the end portions of two conduit sections.

III. Connector with Carbon Cloth Inner Wall

Figure 2B:
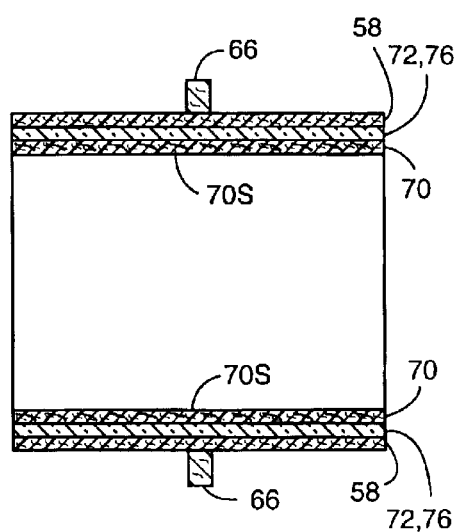
FIG. 2B is a schematic cross-sectional view of the FIG. 1 connector fabricated according to a second process embodiment.

FIGS. 3, 5, 6B, 7B, 8, 9, 10 and 11 show sequential steps in fabricating a self-grounding connector 20B according to a second embodiment of the invention, as shown in FIGS. 1 and 2B. The first, fifth, sixth, seventh and eighth steps are identical, respectively, to the first, fifth, sixth, seventh and eighth steps used in fabricating connector 20A. So only the second, third and fourth steps are described below.

Figure 5:
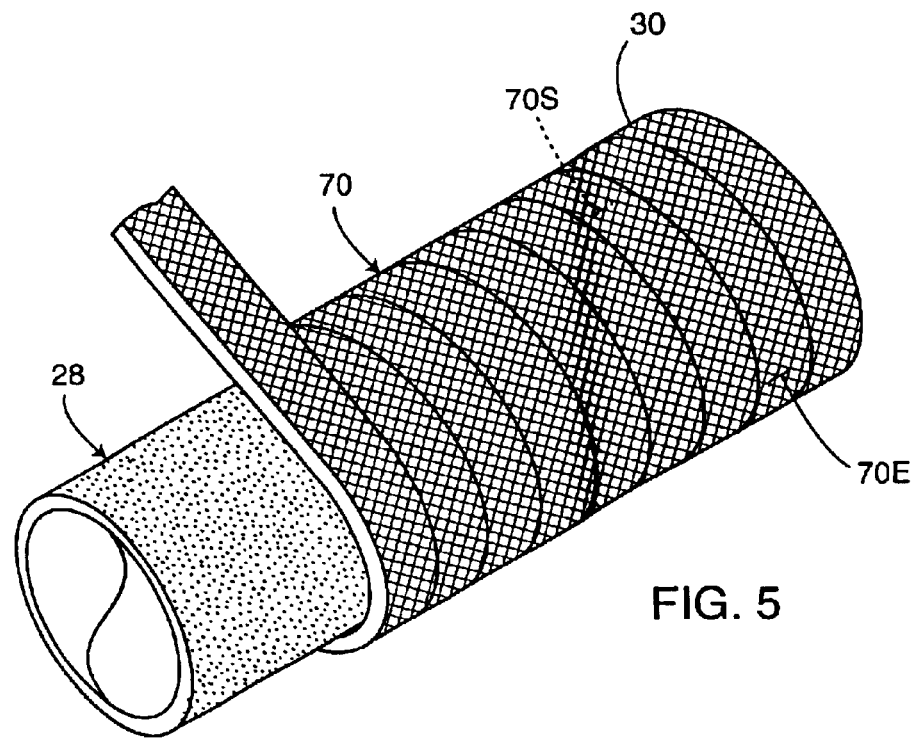
FIG. 5 schematically shows a second step in making the FIG. 2B connector wherein a layer of carbon cloth wetted out with the FIG. 3 admixture is helically wound around the FIG. 3 sheeting.

Referring to FIG. 5, in a second step a single layer 70 of carbon cloth having an interior surface 70S and an exterior surface 70E, wetted out with the admixture 30, is wound helically onto layer 28, and then allowed to cure at ambient temperature. The cured resin fills the interstices of the porous cloth to form an impermeable barrier. Preferably, the cloth is carbon "boat" cloth about 10 mils in thickness, available commercially from Zoltek Corporation.

Figure 6B:
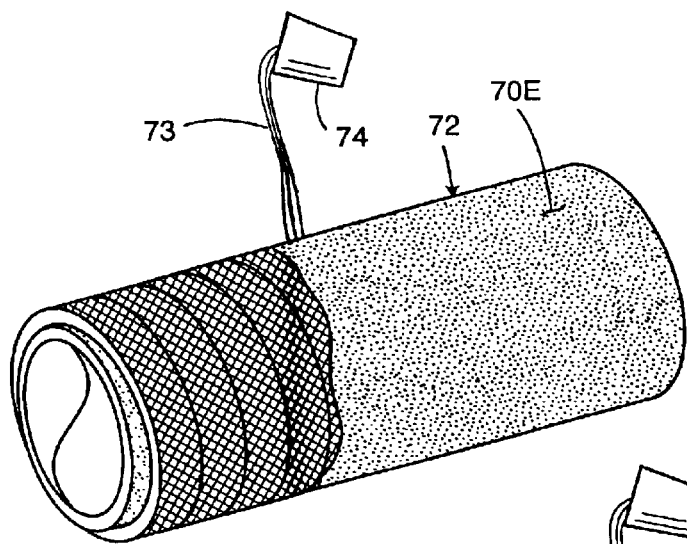
FIG. 6B shows a third step in making the FIG. 2B connector wherein a thin coating of putty is applied to the outer surface of the FIG. 5 carbon cloth after it has cured.

Referring to FIG. 6B, in a third step a thin layer 72 of putty 73 is dispensed from a dispensing device 74 onto surface 70E. Preferably, the thickness of layer 72 is about 10 mils. Preferably, the putty is an admixture including vinyl ester resin and benzoyl peroxide curing agent, chopped carbon fibers in a percentage-by-weight of 1 to 20 percent, and fumed silica in a percentage-by-weight of 3 to 10 percent. Alternatively, the putty is an admixture including epoxy resin and amine curing agent, chopped carbon fibers in a percentage-by-weight of 1 to 20 percent, and fumed silica in a percentage-by-weight of 3 to 10 percent.

Figure 7B:
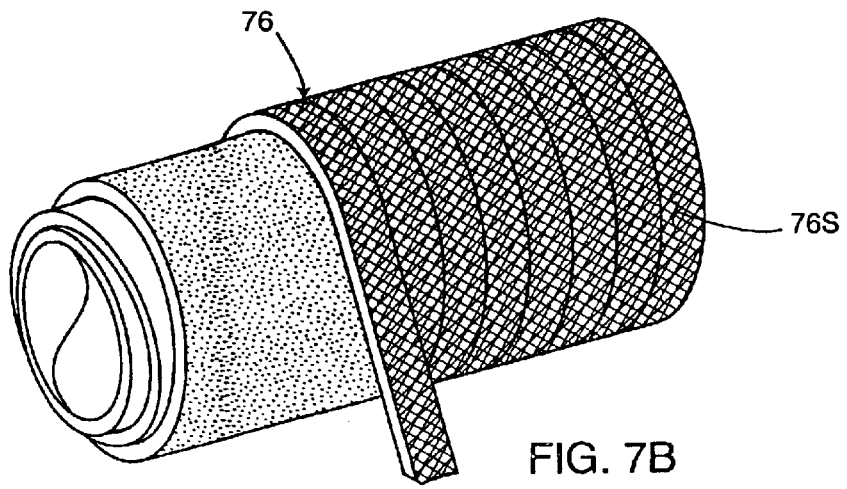
FIG. 7B shows a fourth step in making the FIG. 2B connector wherein a layer of surfacing veil is helically wound into the still-soft FIG. 6B putty, which is then cured.

Referring to FIG. 7B, in a fourth step a layer 76 of surfacing veil having an outer surface 76S is wound into the still-soft putty. Preferably, the veil is glass C-veil about 10 mils in thickness. Before proceeding to the fifth step wherein surface 76S is evenly coated with a thin layer of liquid admixture 30, the putty is allowed to cure.

IV. Resistivity Test Results

A. Test Method

Volume and surface resistivity tests according to ASTM D 4496-87 were performed on specimens cut from a connector having fabricated according to the first process embodiment of the present invention. The connector was approximately 6-inches in diameter by 3.5-inches wide by 0.070-inch thick. The tests were performed by Delsen Testing Laboratories, Inc. of Glendale, Calif. Five specimens, each approximately 3.5-inches by 1-inch, were cut out from the axial direction of the connector. The specimens were cleaned with isopropyl alcohol and distilled water and dried at room ambient conditions. A four-point measurement technique was used to determine the resistance of the specimens. Two ends of each specimen were painted with conductive silver paint and served as current electrodes. Two conductive silver paint lines were applied across the width of the inner surface of each specimen and served as potential electrodes. While DC current was applied to the specimen through the two outer electrodes, the potential drop between the two inner electrodes was measured.

Resistance was calculated as follows:

$$R=V/I$$

where R=resistance (ohms); V=potential drop (volts); I=applied currrent (amperes).

Volume and surface resistivity were calculated as follows:

$$\rho_V = ((2.54 \times t \times W)/L) \times R$$

$$\rho_S = (W/L) \times R$$

where $\rho_V$ = volume resistivity (ohm-cm)

$\rho_S$ = surface resistivity (ohms/square)

R = resistance (ohms)

t = specimen thickness (inches)

L = distance between potential electrodes (inches)

W = specimen width (inches)

B. Test Results

All tests were performed at 73° F. temperature and 35% relative humidity. Table 1 shows the resistances measured on each of the five specimens, and the calculated volume and surface resistivities. In all cases the measured resistance was extremely low.

TABLE 1

VOLUME AND SURFACE RESISTIVITY

| TEST METHOD: | ASTM D 4496-87 (Reapproved 1998) |
|---|---|
| ELECTRODE TYPE: | Conductive silver paint |
| TEST CONDITIONS: | Tested at 73° F. and 35% R.H. |

| CURRENT DIRECTION | SPECIMEN WIDTH inches | SPECIMEN THICKNESS inches | DISTANCE BETWEEN POTENTIAL ELECTRODE inches | RESISTANCE ohms | VOLUME RESISTIVITY ohm-cm | SURFACE RESISTIVITY ohms/square |
|---|---|---|---|---|---|---|
| Specimen No. 1 | | | | | | |
| Forward | 1.00 | 0.070 | 1.98 | 10.72 | 0.96 | 5.4 |
| Reverse | 1.00 | 0.070 | 1.98 | 10.73 | 0.96 | 5.4 |
| Specimen No. 2 | | | | | | |
| Forward | 1.01 | 0.070 | 1.97 | 9.46 | 0.86 | 4.9 |
| Reverse | 1.01 | 0.070 | 1.97 | 9.47 | 0.86 | 4.9 |
| Specimen No. 3 | | | | | | |
| Forward | 0.99 | 0.070 | 1.98 | 9.46 | 0.84 | 4.7 |
| Reverse | 0.99 | 0.070 | 1.98 | 9.46 | 0.84 | 4.7 |
| Specimen No. 4 | | | | | | |
| Forward | 1.01 | 0.070 | 1.97 | 6.79 | 0.62 | 3.5 |
| Reverse | 1.01 | 0.070 | 1.97 | 6.79 | 0.62 | 3.5 |
| Specimen No. 5 | | | | | | |
| Forward | 1.01 | 0.070 | 1.97 | 9.30 | 0.85 | 4.8 |
| Reverse | 1.01 | 0.070 | 1.97 | 9.30 | 0.85 | 4.8 |

What is claimed is:

1. A rigid self-grounding connector for joining end portions of fluid flow conduit sections, said connector comprising:
    an inner layer determining a connector inner surface and comprising a first highly electrically conductive material, and an outer layer determining a connector outer surface and comprising a second highly electrically conductive material, said first and second materials, respectively, dissipating and neutralizing electrostatic charges accumulating on said inner and outer surfaces.

2. The connector of claim 1 wherein said first material comprises at least one continuous carbon ribbon having a multiplicity of carbon fiber-filaments.

3. The connector of claim 2 wherein each carbon ribbon is helically disposed within said inner layer.

4. The connector of claim 3 wherein each carbon ribbon has been saturated with an admixture of a settable chemically resistant resin and a curing agent therefor.

5. The connector of claim 1 wherein said first material comprises carbon cloth.

6. The connector of claim 5 wherein said cloth has been saturated with an admixture of a settable chemically resistant resin and a curing agent therefor.

7. The connector of claim 4 or 6 wherein said resin is a halogenated epoxy vinyl ester resin.

8. The connector of claim 4 or 6 wherein said resin is an unhalogenated epoxy vinyl ester resin.

9. The connector of claim 1 wherein said second material comprises a multiplicity of chopped carbon fibers.

10. The connector of claim 9 wherein said fibers are manufactured from polyacrylonitrile precursor.

11. The connector of claim 10 wherein said fibers terminate in said connector outer surface.

12. The connector of claim 1 wherein a layer comprising surfacing veil is disposed between said inner and outer layers.

13. The connector of claim 12 wherein said connector outer surface has depending upwardly therefrom a centrally disposed, circumferential highly electrically conductive bead for aligning thereon end portions of fluid flow conduit sections.

14. The connector of claim 13 wherein said bead comprises a multiplicity of ribbon-layers of at least one carbon ribbon.

15. A process for making a self-grounding connector for joining end portions of fluid flow conduit sections, comprising the steps of:
    covering a mandrel with a non-sticking material;
    forming over said material a first layer using a first conductive material and a fluidic admixture;
    forming over the first layer a second layer using a second conductive material and the fluidic admixture; and removing the formed first and second layers from the mandrel to form the self-grounding connector.

16. The process of claim 15 wherein:

said first conductive material comprises carbon filaments;

said fluidic admixture comprises a settable chemically resistant resin and a curing agent therefor; and said second material comprises carbon fibers.

17. The process of claim 15 wherein:

said first conductive material comprises carbon cloth;

said fluidic admixture comprises a settable chemically resistant resin and a curing agent therefor; and said second material comprises carbon fibers.

* * * * *